(12) United States Patent
Ma et al.

(10) Patent No.: US 12,542,494 B2
(45) Date of Patent: Feb. 3, 2026

(54) FLYBACK POWER CONVERTER AND CONTROL METHOD THEREOF

(71) Applicant: Delta Electronics (Shanghai) Co., Ltd., Shanghai (CN)

(72) Inventors: Kehua Ma, Shanghai (CN); Daofei Xu, Shanghai (CN); Haitao Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 269 days.

(21) Appl. No.: 18/381,584

(22) Filed: Oct. 18, 2023

(65) Prior Publication Data

US 2024/0162825 A1 May 16, 2024

(30) Foreign Application Priority Data

Nov. 11, 2022 (CN) .......................... 202211411048.2

(51) Int. Cl.
*H02M 3/335* (2006.01)

(52) U.S. Cl.
CPC .... *H02M 3/33576* (2013.01); *H02M 3/33507* (2013.01); *H02M 3/33523* (2013.01)

(58) Field of Classification Search
CPC ......... H02M 3/33507; H02M 3/33523; H02M 3/33576
See application file for complete search history.

(56) References Cited

U.S. PATENT DOCUMENTS

| | | | |
|---|---|---|---|
| 10,103,616 B1* | 10/2018 | Lin | H02M 1/083 |
| 2014/0185333 A1 | 7/2014 | Yang | |
| 2015/0131341 A1 | 5/2015 | Koo et al. | |
| 2017/0176919 A1 | 6/2017 | Asano et al. | |
| 2018/0062529 A1 | 3/2018 | Song et al. | |
| 2019/0013739 A1 | 1/2019 | Hari et al. | |
| 2019/0356232 A1* | 11/2019 | Song | H02M 1/08 |
| 2021/0313897 A1* | 10/2021 | Zhou | H02M 1/0067 |

FOREIGN PATENT DOCUMENTS

| | | |
|---|---|---|
| CN | 110677045 B | 9/2020 |
| CN | 113410994 A | 9/2021 |
| CN | 112003476 B | 2/2022 |

* cited by examiner

*Primary Examiner* — Gary A Nash
(74) *Attorney, Agent, or Firm* — KIRTON McCONKIE; Evan R. Witt (57) ABSTRACT

A control method for a flyback power converter is provided. Firstly, a flyback power converter is provided. The flyback power converter includes a transformer, a leakage inductance energy recovery circuit and a control unit. Then, a delayed turn-off time period is defined by the control unit. Then, a detection signal related to a current flowing through the leakage inductance energy recovery circuit is detected. If the detection signal is greater than or equal to a first set value, a switch element of the leakage inductance energy recovery circuit is turned on. If the detection signal is lower than or equal to a second set value, the second switch element is turned off after the delayed turn-off time period.

20 Claims, 6 Drawing Sheets

FLYBACK POWER CONVERTER AND CONTROL METHOD THEREOF

CROSS-REFERENCE TO RELATED APPLICATION

This application claims priority to China Patent Application No. 202211411048.2, filed on Nov. 11, 2022, the entire contents of which are incorporated herein by reference for all purposes.

FIELD OF THE INVENTION

The present disclosure relates to a power converter, and more particularly to a flyback power converter and a control method of the flyback power converter.

BACKGROUND OF THE INVENTION

Generally, due to the simple control mechanism and low cost, flyback power converters have been widely used in low-power power supply products.

Due to the leakage inductance of the internal transformer in the flyback power converter, the switch element in the flyback power converter has a high voltage stress when it is turned off. In order to overcome this problem, the existing flyback power converter usually uses an RCD clamping circuit with a resistor, a capacitor and a clamping diode to absorb leakage inductance energy to suppress the voltage stress. However, the RCD clamping circuit also consumes the leakage inductance energy. Especially, most of the energy loss occurs in the reverse recovery process of the clamping diode of the RCD clamping circuit. Moreover, during the reverse recovery process of the clamping diode, the capacitor of the RCD clamping circuit will resonate with the leakage inductor, resulting in oscillation. The oscillation may cause the deterioration of electromagnetic interference (EMI). Moreover, multiple oscillations of the clamping capacitor and leakage inductor will lead to multiple conductions of the clamping diode, resulting in additional energy loss.

In order to suppress the voltage stress and recover the leakage inductance energy, some existing flyback power converters use an active clamp flyback (ACF) control method to achieve greater efficiency and lower voltage stress. However, this control method is complicated, and there is a risk of isolation failure between the primary and secondary sides of the transformer. In addition, this control method will increase the cost of the flyback power converter, and the problem caused by the resonance of the capacitor of the RCD clamping circuit and the leakage inductor cannot be effectively avoided.

Therefore, there is a need of providing an improved flyback power converter and an improved control method in order to overcome the drawbacks of the conventional technologies.

SUMMARY OF THE INVENTION

The present disclosure provides a flyback power converter and a control method. The clamping diode used in the RCD clamping circuit is replaced by the second switch element of the flyback power converter. A detection signal related to the current flowing through the leakage inductance energy recovery circuit is obtained. The on/off states of the second switch element are controlled according to the magnitude of the detection signal. Consequently, the reverse recovery loss of the diode in the flyback power converter is reduced, and the efficiency of the flyback power converter is enhanced. In addition, the control method of the flyback power converter is simplified, the control mechanism is more cost-effective, and the risk of isolation failure between the primary and secondary sides of the transformer is avoided. In the flyback power converter, the leakage inductance energy recovery circuit further includes a second resistor. The second resistor is electrically connected between the second switch element and the primary winding of the transformer. Consequently, the oscillation caused by the resonance between the capacitor and the leakage inductor of the transformer can be suppressed. The problem of the electromagnetic interference is effectively solved.

In accordance with an aspect of present disclosure, a control method for a flyback power converter is provided. The control method includes the following steps. In a step (a), the flyback power converter is provided. The flyback power converter includes a transformer, a leakage inductance energy recovery circuit, a first switch element and a control unit. The leakage inductance energy recovery circuit includes a first capacitor and a second switch element. A first terminal of the first capacitor is electrically connected with a first terminal of a primary winding of the transformer. The second switch element is electrically connected between a second terminal of the capacitor and a second terminal of the primary winding. The control unit is electrically connected with a control terminal of the second switch element. A first terminal of the first switch element is electrically connected with a second terminal of the primary winding. In a step (b), a delayed turn-off time period is defined by the control unit. In a step (c), the control unit detects a detection signal. The detection signal is related to a current flowing through the leakage inductance energy recovery circuit. Then, a step (d) is performed to determine whether the detection signal is greater than or equal to a first set value. When a determining condition of the step (d) is satisfied, a step (e) is performed. Whereas, when the determining condition of the step (d) is not satisfied, the step (c) is performed again. In the step (e), the second switch element is turned on under control of the control unit. Then, a step (f) is performed to determine whether the detection signal is lower than or equal to a second set value. When a determining condition of the step (f) is satisfied, a step (g) is performed. Whereas, when the determining condition of the step (f) is not satisfied, the step (e) is performed again. In the step (g), the second switch element is turned off under control of the control unit after the delayed turn-off time period.

In accordance with another aspect of present disclosure, a flyback power converter is provided. The flyback power converter includes a transformer, a first switch element, a leakage inductance energy recovery circuit and a control unit. The transformer includes a primary winding and a secondary winding. A first terminal of the primary winding is electrically connected with a positive input terminal. A first terminal of the first switch element is electrically connected with a second terminal of the primary winding. A second terminal of the first switch element is electrically connected with a negative input terminal. The leakage inductance energy recovery circuit includes a first capacitor, a resistor and a second switch element. A first terminal of the first capacitor is electrically connected with the first terminal of the primary winding. A first terminal of the second switch element is electrically connected with a second terminal of the first capacitor. A second terminal of the second switch element is electrically connected with a first terminal of the resistor. A second terminal of the resistor is electrically connected with the second terminal of the primary winding. The control unit is electrically connected with the first terminal and the second terminal of the resistor and a control terminal of the second switch element. A delayed turn-off time period is defined by the control unit. A direction of a current flowing through the resistor from the second terminal of the resistor to the first terminal of the resistor is defined as a forward direction. When a current value of the current flowing through the resistor is greater than or equal to a first current set value, the second switch element is turned on under control of the control unit. Whereas, when the current value of the current flowing through the resistor is lower than or equal to a second current set value, the second switch element is turned off under control of the control unit after the delayed turn-off time period.

In accordance with another aspect of present disclosure, a flyback power converter is provided. The flyback power converter includes a transformer, a first switch element, a leakage inductance energy recovery circuit and a control unit. The transformer includes a primary winding and a secondary winding. A first terminal of the primary winding is electrically connected with a positive input terminal. A first terminal of the first switch element is electrically connected with a second terminal of the primary winding. A second terminal of the first switch element is electrically connected with a negative input terminal. The leakage inductance energy recovery circuit includes a first capacitor and a second switch element. A first terminal of the first capacitor is electrically connected with the first terminal of the primary winding. A first terminal of the second switch element is electrically connected with a second terminal of the first capacitor. A second terminal of the second switch element is electrically connected with the second terminal of the primary winding. The control unit is electrically connected with the first terminal, the second terminal and a control terminal of the second switch element. A delayed turn-off time period is defined by the control unit. When a voltage difference between the second terminal and the first terminal of the second switch element is greater than or equal to a first voltage set value, the second switch element is turned on under control of the control unit. Whereas, when the voltage difference between the second terminal and the first terminal of the second switch element is lower than or equal to a second voltage set value, the second switch element is turned off under control of the control unit after the delayed turn-off time period.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
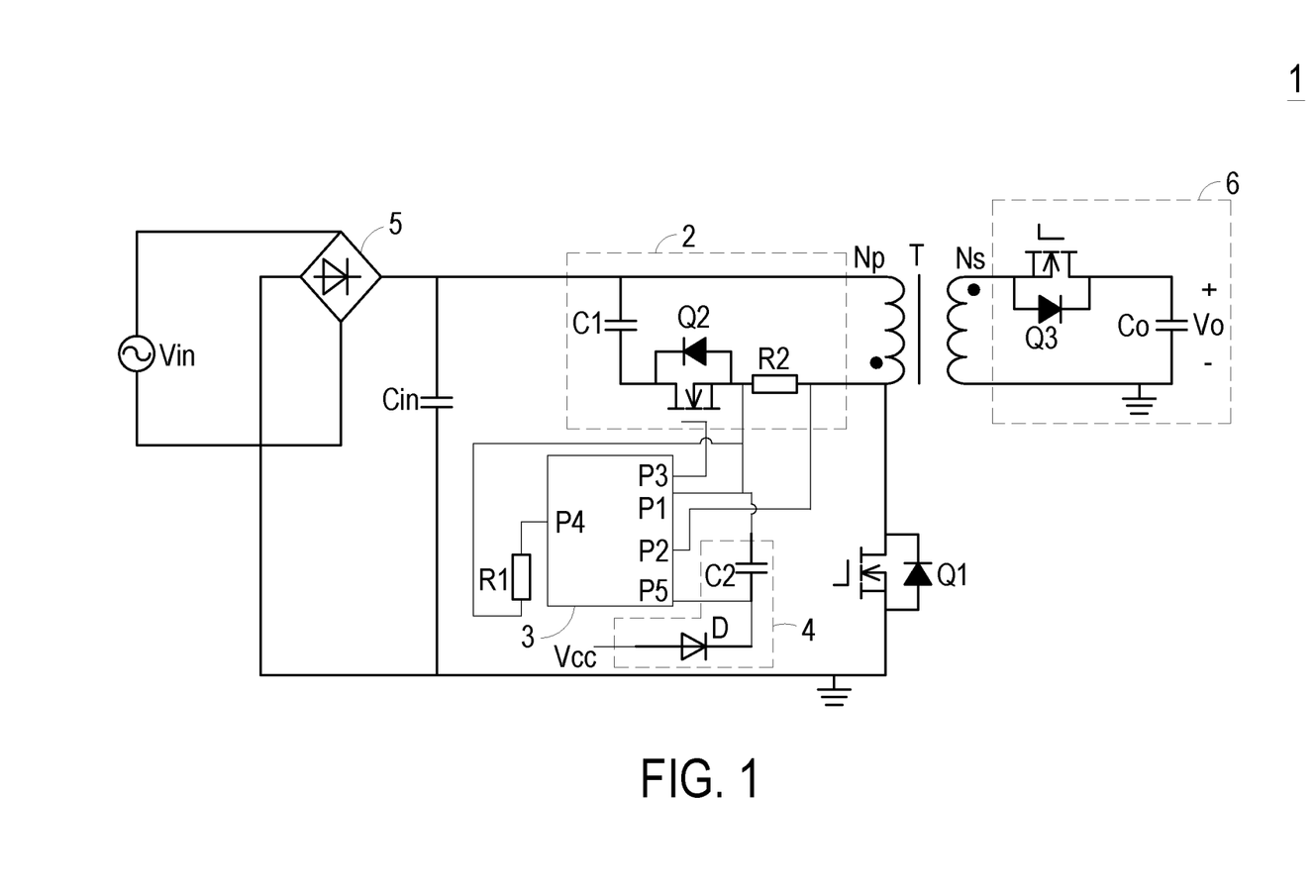
FIG. 1 is a schematic circuit diagram illustrating the circuitry topology of a flyback power converter according to a first embodiment of the present disclosure.
Figure 2:
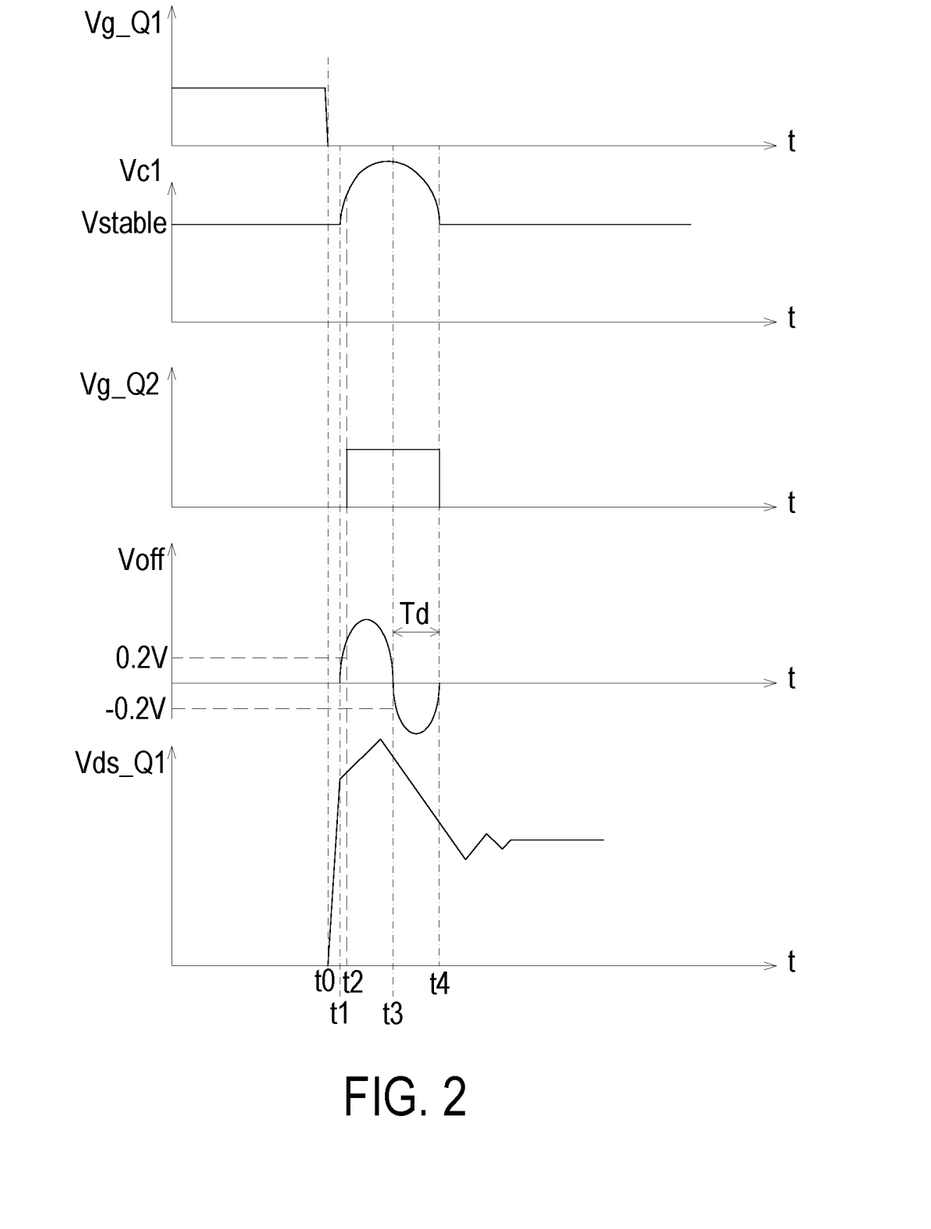
FIG. 2 is a schematic timing waveform diagram illustrating associated signals of the flyback power converter as shown in FIG. 1.

Please refer to FIGS. 1 and 2. FIG. 1 is a schematic circuit diagram illustrating the circuitry topology of a flyback power converter according to a first embodiment of the present disclosure. FIG. 2 is a schematic timing waveform diagram illustrating associated signals of the flyback power converter as shown in FIG. 1. The flyback power converter 1 receives an AC input voltage Vin. By the flyback power converter 1, the AC input voltage Vin is converted into a DC output voltage Vo. In an embodiment, the flyback power converter 1 includes a transformer T, a leakage inductance energy recovery circuit 2, a first switch element Q1, a control unit 3 and a first resistor R1.

The leakage inductance energy recovery circuit 2 includes a first capacitor C1, a second resistor R2 and a second switch element Q2. The first capacitor C1 includes a first terminal and a second terminal. The second resistor R2 includes a first terminal and a second terminal. The second switch element Q2 includes a control terminal, a first terminal and a second terminal. The first terminal of the second switch element Q2 is electrically connected with the second terminal of the first capacitor C1. The second terminal of the second switch element Q2 is electrically connected with the first terminal of the second resistor R2.

The transformer T includes a primary winding Np and a secondary winding Ns, which are magnetically coupled with each other. The primary winding Np includes a first terminal and a second terminal. The first terminal of the primary winding Np is electrically connected with the first terminal of the first capacitor C1. The second terminal of the primary winding Np is electrically connected with the second terminal of the second resistor R2.

The first switch element Q1 includes a control terminal, a first terminal and a second terminal. The first terminal of the first switch element Q1 is electrically connected with the second terminal of the primary winding Np and the second terminal of the second resistor R2. The second terminal of the first switch element Q1 is connected to the ground terminal. The control terminal of the first switch element Q1 is electrically connected with a main controller (not shown). The on/off states of the first switch element Q1 are controlled by the main controller.

The first terminal of the second resistor R2, the second terminal of the second resistor R2 and the control terminal of the second switch element Q2 are electrically connected with the control unit 3. A delayed turn-off time period Td is defined by the control unit 3. Moreover, a first set value and a second set value are previously stored in the control unit 3. For example, the first set value is a first current set value, and the second set value is a second current set value. In addition, the control unit 3 detects a detection signal. The detection signal is related to a current that flows through the leakage inductance energy recovery circuit 2. For example, the control unit 3 detects the current value of the current flowing through the second switch element Q2. The detection result is compared with the first current set value and the second current set value by the control unit 3. According to the comparing result, the on/off states of the second switch element Q2 are correspondingly controlled. In an embodiment, the control unit 3 detects the current value of the current flowing through the second switch element Q2 according to the voltage difference Voff between the second terminal and the first terminal of the second resistor R2 and the known resistance of the second resistor R2.

It is noted that the method of detecting the current value of the current flowing through the second switch element Q2 is not restricted. For example, a Hall current sensor can be used to detect the current value of the current flowing through the second switch element Q2.

The first resistor R1 is electrically connected between the control unit 3 and the first terminal of the second resistor R2 or connected between the control unit 3 and the second terminal of the second switch element Q2. The delayed turn-off time period Td can be externally defined according to the resistance of the first resistor R1.

In addition, the direction of the current flowing through the second resistor R2, the second switch element Q2 and the first capacitor C1 sequentially is defined as a forward direction (or a positive direction). That is, the direction of the current flowing through the second resistor R2 from the second terminal of the second resistor R2 to the first terminal of the second resistor R2 is defined as the forward direction.

In an embodiment, the first switch element Q1 and the second switch element Q2 are N-type MOSFET transistors. In each of the first switch element Q1 and the second switch element Q2, the control terminal is the gate terminal, the first terminal is the drain terminal, and the second terminal is the source terminal.

In an embodiment, the flyback power converter 1 further includes a rectifying circuit 5, an input capacitor Cin and a secondary circuit 6. The rectifying circuit 5 receives and rectifies the input voltage Vin. The first terminal of the input capacitor Cin is electrically connected with the rectifying circuit 5 (or a positive input terminal) and the first terminal of the transformer T. The second terminal of the input capacitor Cin is connected with the ground terminal (or a negative input terminal). The input capacitor Cin is used for voltage stabilization. The secondary circuit 6 is electrically connected with the secondary winding Ns of the transformer T. The electric power from the secondary winding Ns is converted by the secondary circuit 6. Consequently, the output voltage Vo is generated and outputted from the flyback power converter 1. In an embodiment, the secondary circuit 6 includes a third switch element Q3 and an output capacitor Co. The third switch element Q3 is electrically connected between the first terminal of the secondary winding Ns and the first terminal of the output capacitor Co. The second terminal of the output capacitor Co is connected to the ground terminal. The first terminal and the second terminal of the output capacitor Co are formed as the output terminal of the flyback power converter 1 to output the output voltage Vo.

Hereinafter, the operations of the flyback power converter 1 will be described with reference to FIGS. 1 and 2.

In the time interval between the time point t0 and the time point t1, the driving voltage Vg_Q1 provided to the control terminal of the first switch element Q1 is switched from a high-level state to a low-level state. Consequently, the first switch element Q1 is switched from the on state to the off state. Moreover, the drain-source voltage between the first terminal and the second terminal of the first switch element Q1 is gradually increased. According to the voltage difference Voff between the second terminal and the first terminal of the second resistor R2 and the known resistance of the second resistor R2, the current value of the current flowing through the second switch element Q2 (i.e., the current flowing through the leakage inductance energy recovery circuit 2) is detected by the control unit 3. Since the current value of the current flowing through the second switch element Q2 is lower than the first current set value, the second switch element Q2 is turned off under control of the control unit 3. Moreover, at the time point t1, the condition of turning on the body diode of the second switch element Q2 is satisfied.

In the time interval between time point t1 and the time point t2, the current value of the current flowing through the second resistor R2 is still lower than the first current set value. Consequently, the second switch element Q2 is turned off. Meanwhile, the leakage inductance energy of the transformer T is transferred through the body diode of the second switch element Q2 and recycled to the first capacitor C1 to charge the first capacitor C1. Consequently, the capacitor voltage Vc1 of the first capacitor C1 is gradually increased from a stable voltage Vstable.

At the time point t2, the control unit 3 detects that the current value of the current flowing through the second resistor R2 is equal to the first current set value. Meanwhile, under control of the control unit 3, the driving voltage Vg_Q2 provided to the control terminal of the second switch element Q2 is switched from a low-level state to a high-level state. Consequently, the second switch element Q2 is switched from the off state to the on state. As mentioned above, in the time interval between the time point t1 and the time point t2, the leakage inductance energy of the transformer T is transferred through the body diode of the second switch element Q2. However, in the time interval between the time point t2 and the time point t3, the leakage inductance energy of the transformer T is not transferred through the body diode of the second switch element Q2. Whereas, the leakage inductance energy of the transformer T is transferred through the channel region of the second switch element Q2 and recycled to the first capacitor C1.

At the time point t3, the second switch element Q2 is reversely conducted, and the current flows through the second switch element Q2 in a reverse direction (or a negative direction). Meanwhile, the control unit 3 detects that the current value of the current flowing through the second switch element Q2 is equal to the second current set value. Consequently, after the delayed turn-off time period Td from the time point t3, the second switch element Q2 is turned off under control of the control unit 3. For example, at the time point t4, the second switch element Q2 is turned off under control of the control unit 3. The delayed turn-off time period Td is equal to the time length between the time point t3 and the time point t4. In the time interval between the time point t3 and the time point t4, the first capacitor C1 is discharged. Consequently, the capacitor voltage Vc1 is gradually decreased. In addition, the stored energy in the first capacitor C1 is discharged to the leakage inductor of the transformer T and the output terminal of the flyback power converter 1.

At the time point t4, the second switch element Q2 is turned off. Under this circumstance, the current flows in the reverse direction. That is, the current direction is opposite to the conduction direction of the body diode of the second switch element Q2. Under this circumstance, no reverse recovery process is performed. The stored energy in the first capacitor C1 is discharged through the channel region of the second switch element Q2. Consequently, the energy is transferred to the secondary side of the transformer T. Since the reverse recovery process of the diode does not occur, the reverse recovery loss of the diode is reduced, and the efficiency of the flyback power converter 1 is enhanced. In addition, a greater portion of the leakage inductance is recycled. When compared with the flyback power converter using the active clamp flyback (ACF) control method, the control method of the flyback power converter 1 is simplified and the control mechanism is more cost-effective. In addition, the risk of isolation failure between the primary and secondary sides of the transformer is avoided. Since the second resistor R2 is electrically connected between the second switch element Q2 and the primary winding Np of the transformer T, the oscillation caused by the resonance between the first capacitor C1 and the leakage inductor of the transformer T can be suppressed. Consequently, the problem of the electromagnetic interference is effectively solved. In the conventional RCD clamping circuit, the clamping capacitor and the clamping resistor are connected with each other in parallel. However, in the leakage inductance energy recovery circuit 2 of the flyback power converter 1 of the present disclosure, no resistor is connected with the first capacitor C1 in parallel. Consequently, the energy loss of the first capacitor C1 is avoided.

In an embodiment, the flyback power converter includes a resonant circuit, and the resonant circuit includes the leakage inductor of the transformer T and the first capacitor C1. The resonant circuit has a resonant cycle. The delayed turn-on time period Td defined by the control unit 3 is in the range between ¼ and ½ of the resonant cycle.

In an embodiment, the first current set value is in the range between 0.1 A and 0.5 A. For example, the first current set value is 0.1 A. The second current set value is in the range between –0.5 A and 0 A. For example, the second current set value is –0.1 A. Moreover, the second resistor R2 is in the range between 0.5 ohm and 100 ohm.

It is assumed that the resistance of the second resistor R2 is 2 ohm. In case that the voltage difference Voff between the second terminal and the first terminal of the second resistor R2 is equal to or lower than 0.2V, the control unit 3 detects that the current value of the current flowing through the second resistor R2 is lower than the first current set value. In case that the voltage difference Voff between the second terminal and the first terminal of the second resistor R2 is equal to or lower than –0.2V, the control unit 3 detects the current value of the current flowing through the second resistor R2 is equal or lower than the second current set value. Moreover, the stable voltage Vstable of the capacitor voltage Vc1 of the first capacitor C1 is determined according to the delayed turn-off time period Td. In an embodiment, the delayed turn-off time period Td of the control unit 3 is determined according to the resistance of the first resistor R1. Preferably, delayed turn-off time period Td is previously stored in the control unit 3.

For well understanding the concepts of the present disclosure, some parameters of the flyback power converter 1 will be described as follows. In an embodiment, the voltage specifications of the first switch element Q1 and the second switch element Q2 are identical. However, the on-resistance of the first switch element Q1 is at the mohm level, and the on-resistance of the second switch element Q2 is at the ohm level.

Consequently, the switching speed of the second switch element Q2 is fast, and the conduction time of the body diode of the second switch element Q2 is reduced. The gate-source charge (Qgs) of the second switch element Q2 is lower than 10 nC. Furthermore, the input voltage Vin of the flyback power converter 1 is the AC input voltage, and the voltage range is between 90Vac and 264Vac. The transformation ratio of the transformer T is 6:1. The leakage inductance of the transformer T is 5.4 uH. The working frequency is 60 kHz. The output voltage Vo is 20V. The capacitance of the first capacitor C1 is 10 nF~47 nF. The delayed turn-off time period Td can be defined according to the first resistor R1. Moreover, the delay setting function can be realized by a RC oscillator in the control unit 3. For example, the delay setting function is 100 kohm/1 us. If 1.2 us delay time is required, the first resistor R1 with the resistance of 120 kohm is feasible. It is noted that the above parameters are not restricted. That is, the parameters of the flyback power converter 1 may be varied according to the practical requirements.

In an embodiment, the control unit 3 is an IC chip with five pins. The five pins include a first pin P1, a second pin P2, a third pin P3, a fourth pin P4 and a fifth pin P5. The first pin P1 is electrically connected with the first terminal of the second resistor R2. The second pin P2 is electrically connected with the second terminal of the second resistor R2 and the first switch element Q1. The third pin P3 is electrically connected with the control terminal of the second switch element Q2. The fourth pin P4 is electrically connected with the first resistor R1.

In an embodiment, the flyback power converter 1 further includes a bootstrap circuit 4. The bootstrap circuit 4 is electrically connected with the first pin P1 and the fifth pin P5 of the control unit 3 to provide electric power to the control unit 3. The bootstrap circuit 4 includes a diode D and a bootstrap capacitor C2. The anode of the diode D is electrically connected with a voltage source VCC. The cathode of the diode D is electrically connected with a first terminal of the bootstrap capacitor C2 and the fifth pin P5 of the control unit 3. The second terminal of the bootstrap capacitor C2 is electrically connected with the first pin P1 of the control unit 3. When the first switch element Q1 is turned on, the second pin P2 is connected to the ground terminal, and the voltage source VCC is transmitted through the diode D to charge the fifth pin P5 of the control unit 3. When the first switch element Q1 is turned off, the stored energy in the fifth pin P5 of the control unit 3 provides a driving signal to the second switch element Q2.

Figure 3:
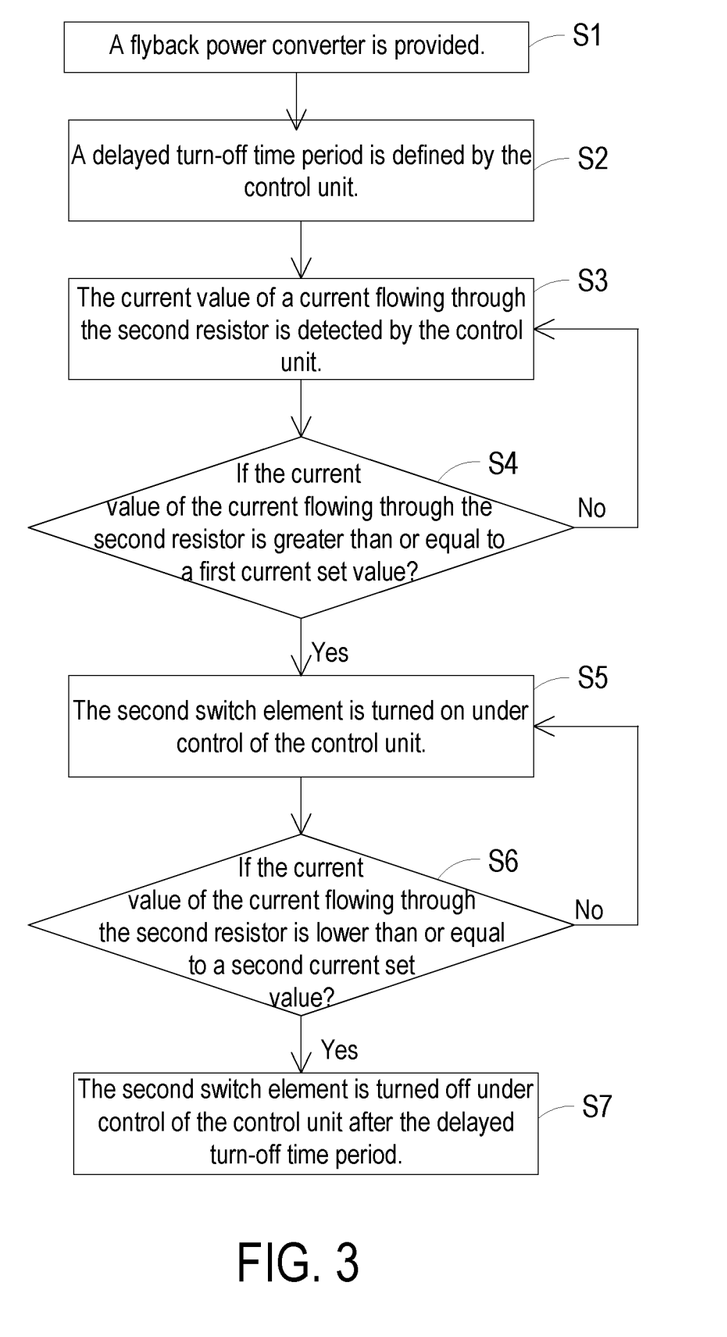
FIG. 3 is a flowchart illustrating a control method for the flyback power converter according to an embodiment of the present disclosure.

Please refer to FIGS. 1, 2 and 3. FIG. 3 is a flowchart illustrating a control method for the flyback power converter according to an embodiment of the present disclosure. The control method is applied to the flyback power converter 1 as shown in FIG. 1. As shown in FIG. 3, the control method includes the following steps.

In a step S1, the flyback power converter 1 as shown in FIG. 1 is provided.

In a step S2, a delayed turn-off time period Td is defined by the control unit 3.

In a step S3, the control unit 3 detects a detection signal. The detection signal is related to a current that flows through the leakage inductance energy recovery circuit 2. For example, the detection signal is a current value of a current flowing through the second resistor R2. Moreover, the direction of the current flowing through the second resistor R2, the second switch element Q2 and the first capacitor C1 sequentially is defined as a forward direction (or a positive direction). That is, the direction of the current flowing through the second resistor R2 from the second terminal of the second resistor R2 to the first terminal of the second resistor R2 is defined as the forward direction.

Then, a step S4 is performed to determine whether the detection signal is greater than or equal to a first set value. In case that the detection signal is the current value of the current flowing through the second resistor R2, the first set value is a first current set value. That is, the step S4 is performed to determine whether the current value of the current flowing through the second resistor R2 is greater than or equal to the first current set value. If the determining condition of the step S4 is satisfied, a step S5 is performed. Whereas, if the determining condition of the step S4 is not satisfied, the step S3 is repeatedly done.

In a step S5, the second switch element Q2 is turned on under control of the control unit 3.

Then, a step S6 is performed to determine whether the detection signal is lower than or equal to a second set value. In case that the detection signal is the current value of the current flowing through the second resistor R2, the second set value is a second current set value. That is, the step S6 is performed to determine whether the current value of the current flowing through the second resistor R2 is lower than or equal to the second current set value. If the determining condition of the step S6 is satisfied, a step S7 is performed. Whereas, if the determining condition of the step S6 is not satisfied, the step S5 is repeatedly done.

In a step S7, the second switch element Q2 is turned off under control of the control unit 3 after the delayed turn-off time period Td.

Figure 4:
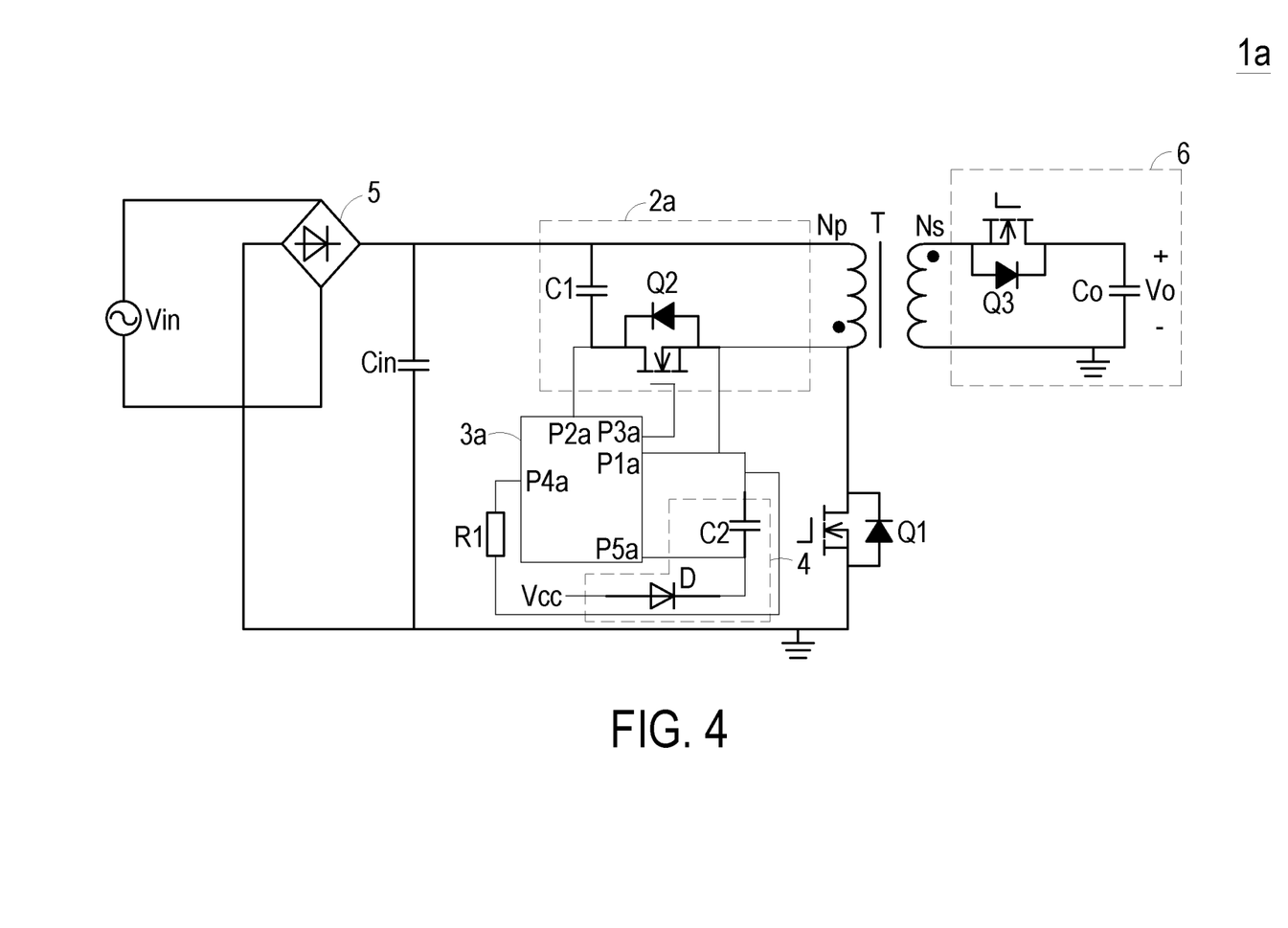
FIG. 4 is a schematic circuit diagram illustrating the circuitry topology of a flyback power converter according to a second embodiment of the present disclosure.
Figure 5:
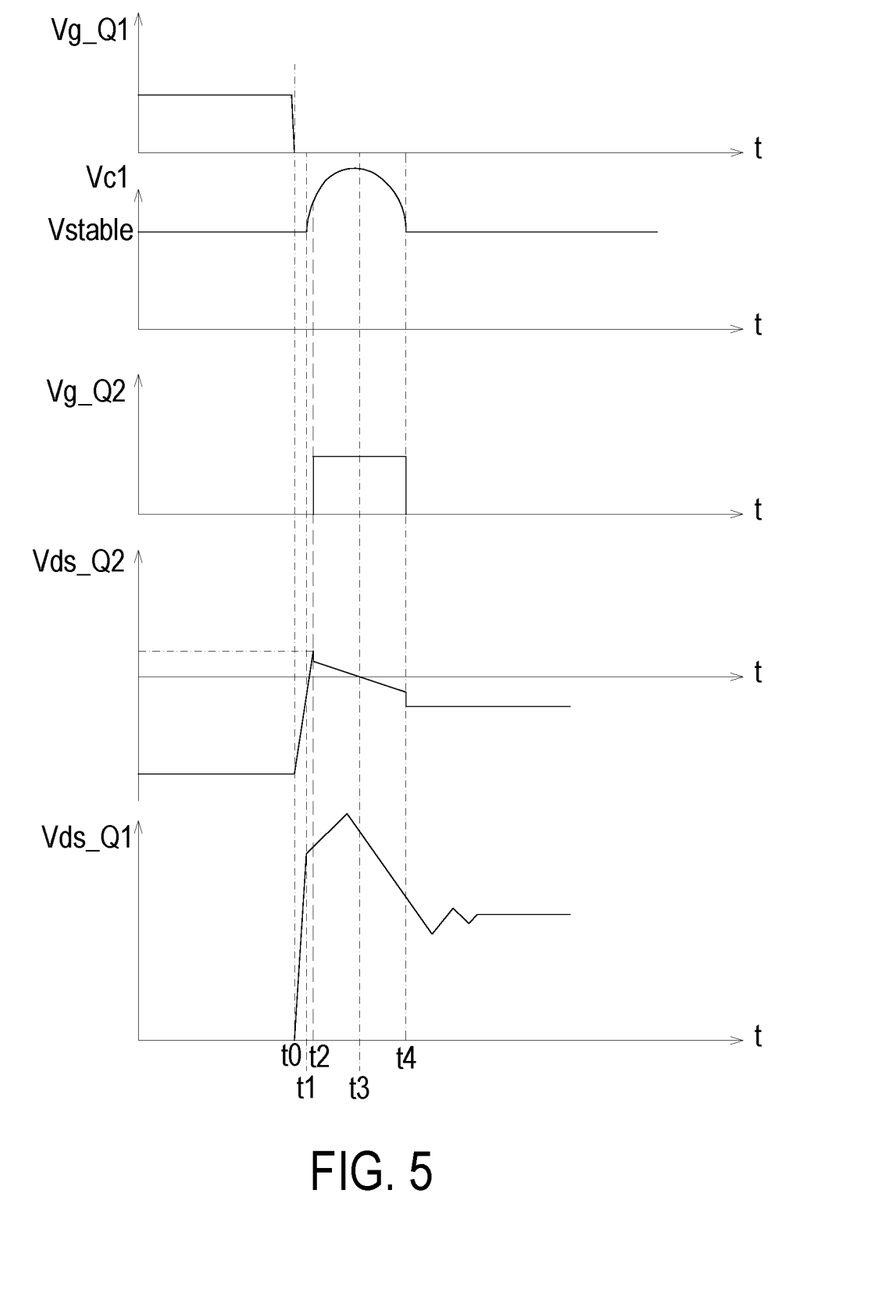
FIG. 5 is a schematic timing waveform diagram illustrating associated signals of the flyback power converter as shown in FIG. 4.

Please refer to FIGS. 4 and 5. FIG. 4 is a schematic circuit diagram illustrating the circuitry topology of a flyback power converter according to a second embodiment of the present disclosure. FIG. 5 is a schematic timing waveform diagram illustrating associated signals of the flyback power converter as shown in FIG. 4. The circuitry topology and the operation of the flyback power converter 1a in this embodiment are similar to those of the flyback power converter 1 of the first embodiment. Component parts and elements corresponding to those of the first embodiment are designated by identical numeral references, and detailed descriptions thereof are omitted. For succinctness, only the distinguished aspects will be described as follows. In the flyback power converter 1a of this embodiment, the leakage inductance energy recovery circuit 2a includes a first capacitor C1 and a second switch element Q2. The second terminal of the second switch element Q2 is electrically connected with the second terminal of the second terminal of the primary winding Np of the transformer T.

The control unit 3a is electrically connected with the first terminal, the second terminal and the control terminal of the second switch element Q2. A delayed turn-off time period Td is defined by the control unit 3a. Moreover, a first set value and a second set value are previously stored in the control unit 3a. For example, the first set value is a first voltage set value, and the second set value is a second voltage set value. In addition, the control unit 3a detects a detection signal. The detection signal is related to a current that flows through the leakage inductance energy recovery circuit 2a. For example, the control unit 3a detects the voltage difference between the second terminal and the first terminal of the second switch element Q2. The detection result is compared with the first voltage set value and the second voltage set value by the control unit 3a. According to the comparing result, the on/off states of the second switch element Q2 are correspondingly controlled.

Hereinafter, the operations of the flyback power converter 1a will be described with reference to FIGS. 4 and 5.

In the time interval between the time point t0 and the time point t1, the driving voltage Vg_Q1 provided to the control terminal of the first switch element Q1 is switched from a high-level state to a low-level state. Consequently, the first switch element Q1 is switched from the on state to the off state. Moreover, the drain-source voltage Vds_Q1 between the first terminal and the second terminal of the first switch element Q1 is gradually increased. Meanwhile, the control unit 3a detects that the voltage difference Vsd_Q2 between the first terminal and the second terminal of the second switch element Q2 is lower than the first voltage set value. Consequently, the second switch element Q2 is turned off under control of the control unit 3a. Moreover, at the time point t1, the condition of turning on the body diode of the second switch element Q2 is satisfied.

In the time interval between time point t1 and the time point t2, the voltage difference Vsd_Q2 is still lower than the first voltage set value. Consequently, the second switch element Q2 is turned off. Meanwhile, the leakage inductance energy of the transformer T is transferred through the body diode of the second switch element Q2 and recycled to the first capacitor C1 to charge the first capacitor C1. Consequently, the capacitor voltage Vc1 of the first capacitor C1 is gradually increased from a stable voltage Vstable.

At the time point t2, the control unit 3a detects that the voltage difference Vsd_Q2 is equal to the first voltage set value. The driving voltage VG_Q2 provided to the control terminal of the second switch element Q2 is switched from a low-level state to a high-level state under control of the control unit 3a. Consequently, the second switch element Q2 is switched from the off state to the on state. As mentioned above, in the time interval between the time point t1 and the time point t2, the leakage inductance energy of the transformer T is transferred through the body diode of the second switch element Q2. However, in the time interval between the time point t2 and the time point t3, the leakage inductance energy of the transformer T is not transferred through the body diode of the second switch element Q2. Whereas, the leakage inductance energy of the transformer T is transferred through the channel region of the second switch element Q2 and recycled to the first capacitor C1.

Since the on-resistance of the second switch element Q2 is relatively greater, the current flowing through the on-resistance results in a voltage drop. Consequently, in the time interval between the time point t2 and the time point t4, there is a voltage difference between the second terminal and the first terminal of the second switch element Q2.

At the time point t3, the second switch element Q2 is reversely conducted. In addition, the control unit 3a detects that the voltage difference Vsd_Q2 between the first terminal and the second terminal of the second switch element Q2 is equal to the second voltage set value. Consequently, after the delayed turn-off time period Td from the time point t3, the second switch element Q2 is turned off under control of the control unit 3a. For example, at the time point t4, the second switch element Q2 is turned off under control of the control unit 3a. The delayed turn-off time period Td is equal to the time length between the time point t3 and the time point t4. In the time interval between the time point t3 and the time point t4, the first capacitor C1 is discharged. Consequently, the capacitor voltage Vc1 is gradually decreased. In addition, the stored energy in the first capacitor C1 is discharged to the leakage inductor of the transformer T and the output terminal of the flyback power converter 1a.

At the time point t4, the second switch element Q2 is turned off. Under this circumstance, the current flows in the reverse direction. That is, the current direction is opposite to the conduction direction of the body diode of the second switch element Q2. Under this circumstance, no reverse recovery process is performed. The stored energy in the first capacitor C1 is discharged through the channel region of the second switch element Q2. Consequently, the energy is transferred to the secondary side of the transformer T. Since the reverse recovery process of the diode does not occur, the reverse recovery loss of the diode is reduced, and the efficiency of the flyback power converter 1a is enhanced. In addition, a greater portion of the leakage inductance is recycled. When compared with the flyback power converter using the active clamp flyback (ACF) control method, the control method of the flyback power converter 1a is simplified and the control mechanism is more cost-effective. In addition, the risk of isolation failure between the primary and secondary sides of the transformer is avoided. In the conventional RCD clamping circuit, the clamping capacitor and the clamping resistor are connected with each other in parallel. However, in the leakage inductance energy recovery circuit 2a of the flyback power converter 1a of the present disclosure, no resistor is connected with the first capacitor C1 in parallel. Consequently, the energy loss of the first capacitor C1 is avoided.

In an embodiment, the flyback power converter includes a resonant circuit, and the resonant circuit includes the leakage inductor of the transformer T and the first capacitor C1. The resonant circuit has a resonant cycle. The delayed turn-on time period Td defined by the control unit 3a is in the range between ¼ and ½ of the resonant cycle.

In an embodiment, the first voltage set value is in the range between 0V and 1V, and the second voltage set value is in the range between −1V and 0V. Moreover, the stable voltage Vstable of the capacitor voltage Vc1 of the first capacitor C1 is determined according to the delayed turn-off time period Td. In an embodiment, the delayed turn-off time period Td of the control unit 3a is determined according to the resistance of the first resistor R1. Preferably, delayed turn-off time period Td is previously stored in the control unit 3a.

For well understanding the concepts of the present disclosure, some parameters of the flyback power converter 1a will be described as follows. In an embodiment, the gate-source charge (Qgs) of the second switch element Q2 is lower than 10 nC. The delayed turn-off time period Td can be defined according to the first resistor R1. Moreover, the delay setting function can be realized by a RC oscillator in the control unit 3a. For example, the delay setting function is 100 k/1 us. If 1.2 us delay time is required, the first resistor R1 with the resistance of 120 kohm is feasible. It is noted that the above parameters are not restricted. That is, the parameters of the flyback power converter 1a may be varied according to the practical requirements.

In an embodiment, the control unit 3a is an IC chip with five pins. The five pins include a first pin P1a, a second pin P2a, a third pin P3a, a fourth pin P4a and a fifth pin P5a. The first pin P1a is electrically connected with the second terminal of the second switch element Q2. The second pin P2a is electrically connected with the first terminal of the second switch element Q2. The third pin P3a is electrically connected with the control terminal of the second switch element Q2. The fourth pin P4a is electrically connected with the first resistor R1.

Figure 6:
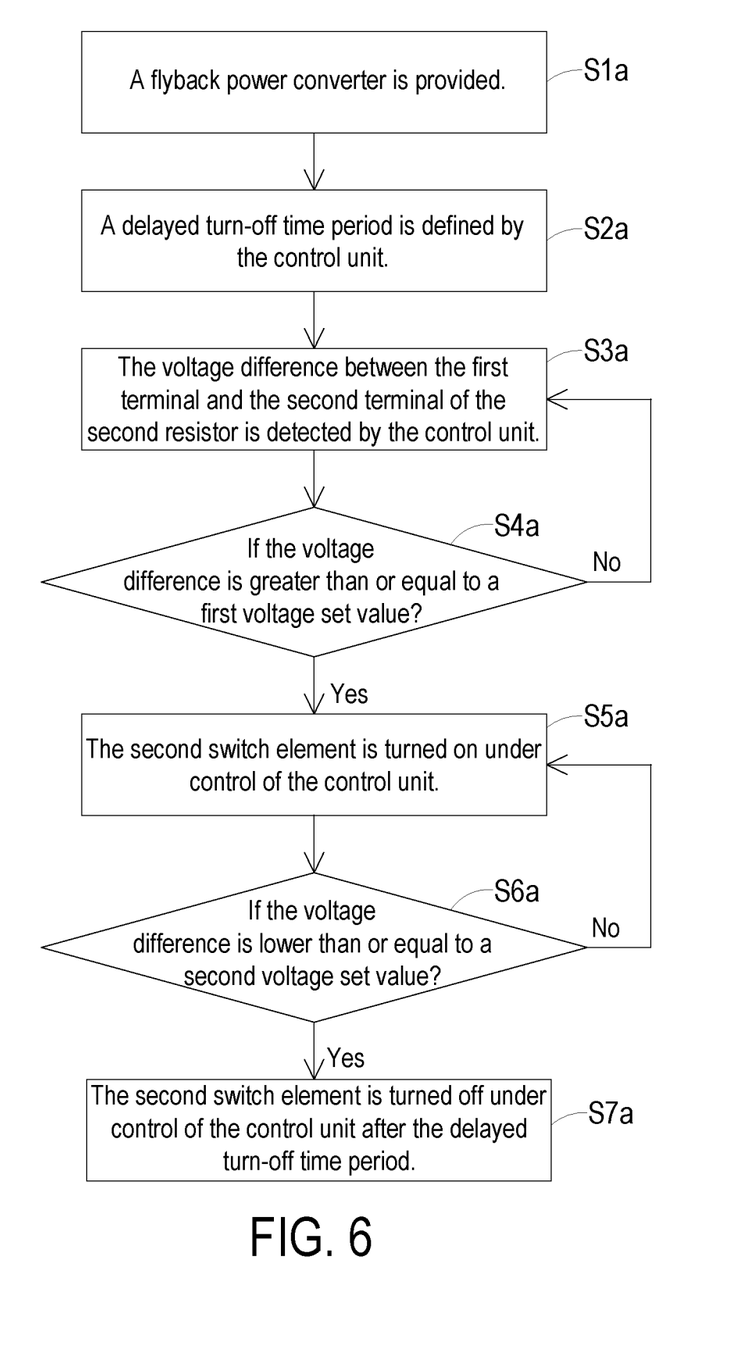
FIG. 6 is a flowchart illustrating a control method for the flyback power converter as shown in FIG. 4.

Please refer to FIGS. 4, 5 and 6. FIG. 6 is a flowchart illustrating a control method for the flyback power converter as shown in FIG. 4. As shown in FIG. 6, the control method is applied to the flyback power converter 1a as shown in FIG. 4, and the control method includes the following steps.

In a step S1a, the flyback power converter 1a as shown in FIG. 4 is provided.

In a step S2a, a delayed turn-off time period Td is defined by the control unit 3a.

In a step S3a, the control unit 3 detects a detection signal. The detection signal is related to a current that flows through the leakage inductance energy recovery circuit 2a. For example, the control unit 3a detects the voltage difference Vsd_Q2 between the first terminal and the second terminal of the second switch element Q2.

Then, a step S4a is performed to determine whether the detection signal is greater than or equal to a first set value. In case that the detection signal is the voltage difference Vsd_Q2 between the first terminal and the second terminal of the second switch element Q2, the first set value is a first voltage set value. That is, the step S4a is performed to determine whether the voltage difference Vsd_Q2 between the first terminal and the second terminal of the second switch element Q2 is greater than or equal to the first voltage set value. If the determining condition of the step S4a is satisfied, a step S5a is performed. Whereas, if the determining condition of the step S4a is not satisfied, the step S3a is repeatedly done.

In a step S5a, the second switch element Q2 is turned on under control of the control unit 3a.

Then, a step S6a is performed to determine whether the detection signal is lower than or equal to a second set value. In case that the detection signal is the voltage difference Vsd_Q2 between the first terminal and the second terminal of the second switch element Q2, the second set value is a second voltage set value. That is, the step S6a is performed to determine whether the voltage difference Vsd_Q2 between the first terminal and the second terminal of the second switch element Q2 is lower than or equal to the second voltage set value. If the determining condition of the step S6a is satisfied, a step S7a is performed. Whereas, if the determining condition of the step S6a is not satisfied, the step S5a is repeatedly done.

In a step S7a, the second switch element Q2 is turned off under control of the control unit 3a after the delayed turn-off time period Td.

From the above descriptions, the present disclosure provides a flyback power converter and a control method. The clamping diode used in the RCD clamping circuit is replaced by the second switch element of the flyback power converter. A detection signal related to the current flowing through the leakage inductance energy recovery circuit is obtained. The on/off states of the second switch element are controlled according to the magnitude of the detection signal. Since the reverse recovery process of the diode does not occur, the reverse recovery loss of the diode is reduced, and the efficiency of the flyback power converter is enhanced. When compared with the flyback power converter using the active clamp flyback (ACF) control method, the control method of the flyback power converter is simplified, and the control mechanism is more cost-effective. In addition, the risk of isolation failure between the primary and secondary sides of the transformer is avoided. Since the second resistor is electrically connected between the second switch element and the primary winding of the transformer, the oscillation caused by the resonance between the first capacitor and the leakage inductor of the transformer can be suppressed. Consequently, the problem of the electromagnetic interference is effectively solved. In the conventional RCD clamping circuit, the clamping capacitor and the clamping resistor are connected with each other in parallel. However, in the leakage inductance energy recovery circuit of the flyback power converter of the present disclosure, no resistor is connected with the first capacitor in parallel. Consequently, the energy loss of the first capacitor is avoided.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for a flyback power converter, the control method comprising steps of:
    (a) providing the flyback power converter, wherein the flyback power converter comprises a transformer, a leakage inductance energy recovery circuit, a first switch element and a control unit, wherein the leakage inductance energy recovery circuit comprises a first capacitor and a second switch element, wherein a first terminal of the first capacitor is electrically connected with a first terminal of a primary winding of the transformer, the second switch element is electrically connected between a second terminal of the first capacitor and a second terminal of the primary winding, the control unit is electrically connected with a control terminal of the second switch element, and a first terminal of the first switch element is electrically connected with a second terminal of the primary winding;
    (b) defining a delayed turn-off time period by the control unit;
    (c) the control unit detecting a detection signal, wherein the detection signal is related to a current flowing through the leakage inductance energy recovery circuit;
    (d) determining whether the detection signal is greater than or equal to a first set value, wherein when a determining condition of the step (d) is satisfied, a step (e) is performed, wherein when the determining condition of the step (d) is not satisfied, the step (c) is performed again;
    (e) turning on the second switch element under control of the control unit;
    (f) determining whether the detection signal is lower than or equal to a second set value, wherein when a determining condition of the step (f) is satisfied, a step (g) is performed, wherein when the determining condition of the step (f) is not satisfied, the step (e) is performed again; and
    (g) turning off the second switch element under control of the control unit after the delayed turn-off time period.

2. The control method according to claim 1, wherein the flyback power converter comprises a resonant circuit, the resonant circuit comprises a leakage inductor of the transformer and the first capacitor, the resonant circuit has a resonant cycle, and the delayed turn-on time period is in a range between ¼ and ½ of the resonant cycle.

3. The control method according to claim 1, wherein a gate-source charge of the second switch element is lower than 10 nC.

4. The control method according to claim 1, wherein the leakage inductance energy recovery circuit further comprises a second resistor, wherein a first terminal of the second resistor is electrically connected with a second terminal of the second switch element and the control unit, and a second terminal of the second resistor is electrically connected with the second terminal of the primary winding and the control unit.

5. The control method according to claim 4, wherein the detection signal is a current value of a current flowing through the second resistor, wherein a direction of the current from the second terminal of the second resistor to the first terminal of the second resistor is defined as a forward direction, the first set value is a first current set value, and the second set value is a second current set value.

6. The control method according to claim 5, wherein the control unit comprises a first pin, a second pin and a third pin, wherein the first pin is electrically connected with the first terminal of the second resistor, the second pin is electrically connected with the second terminal of the second resistor, and the third pin is electrically connected with the control terminal of the second switch element.

7. The control method according to claim 6, wherein the flyback power converter further comprises a bootstrap circuit, and the bootstrap circuit comprises a diode and a bootstrap capacitor, wherein an anode terminal of the diode is electrically connected with a voltage source, a cathode terminal of the diode is electrically connected with a first terminal of the bootstrap capacitor, and a second terminal of the bootstrap capacitor is electrically connected with the first pin.

8. The control method according to claim 5, wherein the first current set value is in a range between 0 A and 0.5 A, and the second current set value is in a range between −0.5 A and 0 A.

9. The control method according to claim 4, wherein a resistance of the second resistor is in a range between 0.5 ohm~100 ohm.

10. The control method according to claim 1, wherein the control unit is further connected with the first terminal and the second terminal of the second switch element, and the detection signal is voltage difference between the second terminal and the first terminal of the second switch element, wherein the first set value is a first voltage set value, and the second set value is a second voltage set value.

11. The control method according to claim 10, wherein the first voltage set value is in a range between 0V and 1V, and the second voltage set value is in a range between −1V and 0V.

12. The control method according to claim 10, wherein the control unit comprises a first pin, a second pin and a third pin, wherein the first pin is electrically connected with the second terminal of the second switch element, the second pin is electrically connected with the first terminal of the second switch element, and the third pin is electrically connected with the control terminal of the second switch element.

13. The control method according to claim 1, wherein the delayed turn-off time period is defined by the control unit, or the delayed turn-off time period is determined according to a resistance of a first resistor, wherein the first resistor is electrically connected between the control unit and the second switch element.

14. A flyback power converter, comprising:
    a transformer comprising a primary winding and a secondary winding, wherein a first terminal of the primary winding is electrically connected with a positive input terminal;
    a first switch element, wherein a first terminal of the first switch element is electrically connected with a second terminal of the primary winding, and a second terminal of the first switch element is electrically connected with a negative input terminal;

a leakage inductance energy recovery circuit comprising a first capacitor, a second resistor and a second switch element, wherein a first terminal of the first capacitor is electrically connected with the first terminal of the primary winding, a first terminal of the second switch element is electrically connected with a second terminal of the first capacitor, a second terminal of the second switch element is electrically connected with a first terminal of the second resistor, and a second terminal of the second resistor is electrically connected with the second terminal of the primary winding; and a control unit electrically connected with the first terminal and the second terminal of the second resistor and a control terminal of the second switch element, wherein a delayed turn-off time period is defined by the control unit or defined according to a first resistor, wherein a direction of a current flowing through the second resistor from the second terminal of the second resistor to the first terminal of the second resistor is defined as a forward direction, wherein when a current value of the current flowing through the second resistor is greater than or equal to a first current set value, the second switch element is turned on under control of the control unit, wherein when the current value of the current flowing through the second resistor is lower than or equal to a second current set value, the second switch element is turned off under control of the control unit after the delayed turn-off time period.

15. The flyback power converter according to claim 14, wherein the flyback power converter comprises a resonant circuit, the resonant circuit comprises a leakage inductor of the transformer and the first capacitor, the resonant circuit has a resonant cycle, and the delayed turn-on time period is in a range between ¼ and ½ of the resonant cycle.

16. The flyback power converter according to claim 14, wherein a gate-source charge of the second switch element is lower than 10 nC.

17. The flyback power converter according to claim 14, wherein the control unit comprises a first pin, a second pin and a third pin, wherein the first pin is electrically connected with the first terminal of the second resistor, the second pin is electrically connected with the second terminal of the second resistor, and the third pin is electrically connected with the control terminal of the second switch element.

18. The flyback power converter according to claim 17, wherein the flyback power converter further comprises a bootstrap circuit, and the bootstrap circuit comprises a diode and a bootstrap capacitor, wherein an anode terminal of the diode is electrically connected with a voltage source, a cathode terminal of the diode is electrically connected with a first terminal of the bootstrap capacitor, and a second terminal of the bootstrap capacitor is electrically connected with the first pin.

19. The flyback power converter according to claim 14, wherein a resistance of the second resistor is in a range between 0.5 ohm~100 ohm, wherein the delayed turn-off time period is determined according to a resistance of the first resistor, and the first resistor is electrically connected between the control unit and the second resistor.

20. A flyback power converter, comprising:
a transformer comprising a primary winding and a secondary winding, wherein a first terminal of the primary winding is electrically connected with a positive input terminal;

a first switch element, wherein a first terminal of the first switch element is electrically connected with a second terminal of the primary winding, and a second terminal of the first switch element is electrically connected with a negative input terminal;

a leakage inductance energy recovery circuit comprising a first capacitor and a second switch element, wherein a first terminal of the first capacitor is electrically connected with the first terminal of the primary winding, a first terminal of the second switch element is electrically connected with a second terminal of the first capacitor, and a second terminal of the second switch element is electrically connected with the second terminal of the primary winding; and a control unit electrically connected with the first terminal, the second terminal and a control terminal of the second switch element, wherein a delayed turn-off time period is defined by the control unit or defined according to a first resistor, wherein when a voltage difference between the second terminal and the first terminal of the second switch element is greater than or equal to a first voltage set value, the second switch element is turned on under control of the control unit, wherein when the voltage difference between the second terminal and the first terminal of the second switch element is lower than or equal to a second voltage set value, the second switch element is turned off under control of the control unit after the delayed turn-off time period.

* * * * *